United States Patent Office 3,644,315
Patented Feb. 22, 1972

3,644,315
MOISTURE-CURABLE POLYMERS
Irwin J. Gardner, Fanwood, and Thomas A. Manuel, Westfield, N.J., assignors to Esso Research and Engineering Company
No Drawing. Continuation-in-part of abandoned application Ser. No. 600,725, Dec. 12, 1966. This application Mar. 14, 1969, Ser. No. 807,433
Int. Cl. C08d 3/02; C08f 15/04
U.S. Cl. 260—85.3     3 Claims

ABSTRACT OF THE DISCLOSURE

Moisture-curable polymers are prepared by reacting an elastomeric or mastic copolymer of a $C_4$–$C_7$ isoolefin (e.g. isobutylene) with an acyclic conjugated diolefin yielding type II unsaturation in the copolymer backbone (e.g. butadiene or piperylene) with a silane (e.g. trichlorosilane) in the presence of a peroxide (e.g. benzoyl peroxide).

REFERENCE TO COPENDING APPLICATION

This application is a continuation-in-part of our application Ser. No. 600,725, filed Dec. 12, 1966, now abandoned, entitled "Moisture-Curable Polymers."

THE PRIOR ART

U.S. Pat. 2,952,576 (to Wheelock et al.) is concerned with the reaction of liquid homo- or copolymers of diolefins with a silicon halide so as to form a polymer product for treating glass fibers. In this patent 5 to 100, preferably 50–100, parts of various diolefins are copolymerized with vinyl group monomers with the total amount of comonomers being set at that figure which will yield a liquid polymer. This liquid polymer is then reacted with a silicon halide in the presence of a peroxide to yield a thermosetting liquid polymer which is applied to glass fibers and laminates of these treated glass fibers are cured at elevated temperatures.

Wheelock et al. utilize alkali metal catalysis to prepare their homo- or copolymers but indicate that any type of catalyst resulting in a liquid polymer can be used. The patentees also equate various types of diolefins and prepare a rubbery polybutadiene-trichlorosilane reaction product for use as a reference material.

THE PRESENT INVENTION

It has now been found that moisture-curable polymers may be formed by grafting selected silanes on to the backbone of certain types of unsaturated polymers. This forms what may be termed a graft copolymer, or an adduct of the basic polymeric backbone. The products of this invention are useful in all applications for which moisture-curable rubbery or mastic materials are desired. They are particularly suitable, for example, as ditch or reservoir liners, since they can be inexpensively sprayed as a latex or as a solution in organic solvent onto a surface to be coated, and after the solvent has evaporated the polymer is cured by atmospheric moisture to provide a waterproof, weather-resistant liner. In particular, the materials of the present invention are prepared by reacting selected polymers with appropriate silane compounds in the presence of a free radical initiator. The resulting product is then cured by exposure to minor amounts of $H_2O$ in the form, for example, of atmospheric moisture, steam or moisture-releasing substances.

It has been unexpectedly found that useful moisture-surable polymers may be prepared provided the following conditions are met:

(1) The "backbone" copolymer must be elastomeric or mastic in nature. That is, the copolymer must be a rubbery solid or semi-solid (i.e. a gum) which has a viscosity average molecular weight in the range of about 3000 to about 1,500,000.

(2) The "backbone" copolymer must utilize a conjugated diolefin which does not contain any substitution (except for hydrogen) on the second and third carbon atoms of the linear conjugate system as shown in the formula below. Thus, copolymers of a conjugated diolefin such as isoprene or 2,3-dimethyl-1,3-butadiene are not suitable.

(3) The conjugated diolefinic units must be copolymerized into the polymer "backbone" predominantly (i.e. at about 70%, preferably at least 80%) in a 1:4 fashion as distinguished from a 1:2 fashion. That is, the double bond must be present in the backbone rather than in a pendant fashion.

It has been found that rubbery copolymers containing pendant vinyl groups are generally unsatisfactory since they lose their elastomeric character (even after curing) over a period of time due to degradative attack (by atmospheric oxygen and ozone) on the pendant vinyl groups. Accordingly, the polymer "backbone" should be prepared with a cationic catalyst as contrasted with the alkali metal catalysts (which result in 1,2-polymerization) employed by Wheelock et al.

(4) The polymeric "backbone" must be such that it contains about 0.5 to about 12, preferably 1 to 10, mole percent unsaturation (i.e. moles of diolefin/total moles of isoolefin and diolefin in polymer). Homopolymers of conjugated dienes (which contain 100 moles percent unsaturation) and copolymers of conjugated dienes having a mole percent unsaturation greater than about 12 are unsuitable since a high level of unsaturation renders the polymer prone to degradative attack (due to atmospheric oxygen and ozone) and concomitant loss of elastomeric properties.

(5) The comonomer in the polymer "backbone" must be an isoolefin as distinguished from the heterocyclic nitrogen compounds, aryl olefins, acrylic acids and esters, nitriles, amides, ketones, ether, halides, etc., employed by Wheelock et al. The use of isoolefins as the comonomers results in a rubbery product having a high impermeability to moisture and air, high oxygen and ozone resistance, high hysteresis and high damping energy.

The polymer "backbone" comprises a copolymer of a $C_4$–$C_7$ isoolefin with a certain type of diolefin. This "backbone" has a viscosity average molecular weight of about 3,000 to 1,500,000 and is a solid elastomer or mastic in nature; the proportions of the monomers in the "backbone" are such that it contains about 0.5 to about 12, preferably 1 to 10, mole percent unsaturation present in substantially a 1:4 rather than 1:2 manner. The following structural formulas indicate the difference between the 1:4 monomeric unit and the 1:2 monomeric unit:

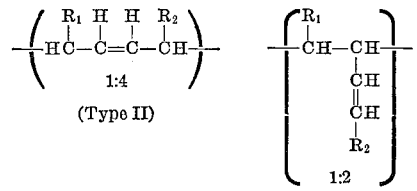

Examples of suitable isoolefins include isobutylene, 3-methylbutene-1, 4-methylpentene-1, 5-methylhexene-1, etc., the preferred isoolefin is isobutylene.

The diolefin copolymerized with the isoolefin is one which corresponds to the formula:

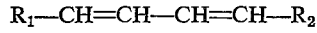

wherein $R_1$ and $R_2$ are the same or different substituents selected from the group consisting of: hydrogen; $C_1$–$C_8$ alkyl (e.g. methyl, ethyl, propyl, isopropyl, butyl, isobutyl, 2-methyl propyl, 2-ethyl propyl, etc.); $C_6$–$C_{12}$ aryl and aralkyl (e.g. phenyl, tolyl, xylyl, etc.); and $C_5$–$C_8$ cycloaliphatic and alkyl cycloaliphatic (e.g. cyclopentyl, cyclohexyl, methyl cyclopentyl, etc.). Specific examples of useful diolefins include butadiene-1,3, piperylene, hexadiene-1,3, hexadiene-2,4, etc.

In preparing the mastic or elastomeric copolymer "backbone" for use in this invention, generally the feed composition contains between about 60 and 99.5 wt. percent, preferably 85–98 wt. percent of isoolefin with the remainder being the conjugated diolefin. The polymerization is generally carried out at a low temperature, e.g. between about −50° and −165° C. or lower in the presence of a Friedel-Crafts catalyst such as aluminum tribromide, aluminum trichloride, aluminum alkyl halide or the like with the reaction being carried out in a diluent medium such as a lower alkyl halide, for example, methyl chloride or ethyl chloride, or a normal alkane. U.S. Pat. No. 2,356,128 describes the methods for the preparation of such isobutylene-diolefin copolymers, and is incorporated herein by reference. The final rubbery or mastic polymer may be solid or semisolid in nature and generally has a viscosity average molecular weight of between about 3,000 and about 1,500,000 and its degree of unsaturation is characterized by a Wijs Iodine No. of between about 0.5 and about 50, usually between about 1 and about 35. Rubbers or mastics of low molecular weight may be produced by increasing the amount of diolefin employed up to about 30% of the total feed and by carrying out the reaction under slightly higher temperatures than hereinbefore mentioned.

An example of a rubber formed in accordance with the above-described process using aluminum chloride as the catalyst and methyl chloride as the reaction solvent, is prepared using a 95% isobutylene-5% piperylene reaction mixture according to the U.S. patent reference hereinbefore cited. The final rubbery polymer has a viscosity average molecular weight of about 342,000 and a mole percent unsaturation of about 2.7. Still another typical rubbery polymer which is suitable for use in the instant invention is produced using a feedstock employing about 100 parts by weight of isobutylene and about 60 parts by weight of butadiene-1,3.

The silane which is grafted onto the polymer "backbone" must be one which corresponds to the formula:

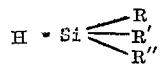

In this formula, R and R' are independently selected from the following groups:

(a) $C_1$–$C_{12}$ hydrocarbyl radicals, preferably $C_1$–$C_6$ hydrocarbyl radicals. Hydrocarbyl radicals include alkyl, cycloalkyl, alicyclic, and acyclic groups; preferred are alkyl groups. Specific examples of these $C_1$–$C_{12}$ hydrocarbyls include methyl, ethyl, propyl, butyl, isopropyl, t-butyl and otcyl.

(b) Hydrogen.

(c) A halogen, such as chlorine, bromine or iodine; preferred is chlorine.

(d) A $C_1$–$C_4$ alkoxy radical. Specific examples of these alkoxy radicals include methoxy, ethoxy, propoxy, and butoxy. Preferred is ethoxy.

(e) A $C_2$–$C_7$ acyloxy radical. Examples of these acyloxy radicals include acetoxy, benzoyloxy, and butyryloxy. Preferred is acetoxy.

R'' in the above empirical formula is selected from any of the above classes c., d. or e. (i.e., a halogen, an alkoxy or an acyloxy, as defined above).

Preferably, R or R' in addition to the R'' is selected from halogen, alkoxy, and acyloxy radicals as defined above. More preferably, R and R' are so selected. The most preferred compound is trichlorosilane.

Silanes which do not correspond to the above formula are not operative in the present invention; for example, it has been found that allyl trichlorosilane and vinyl trichlorosilane have no utility.

The grafting of the silane onto the polymer "backbone" is carried out in the presence of a free radical initiator. Any of the known free radical initiators may be used as a catalyst in the process of this invention. A convenient compendium of known free radical initiators is found in "Free Radicals in Solution" (1957) by Cheves Walling.

Suitable free radical initiators include azo compounds such as azobisisobutyronitrile and azobis-α-phenylpropionitrile; organic peroxides such as benzoyl peroxide and di-t-butyl peroxide; organic hydroperoxides such as cumene hydroperoxide and t-butylhydroperoxide; azides such as benzenesulfonylazide and phenylazide; peresters such as t-butylperbenzoate; and disulfides such as dibenzoyl disulfide and tetramethylthiuram disulfide. Also suitable are gamma radiation and ultraviolet light. The preferred free radical initiator is benzoyl peroxide. It is notable that the catalytic effect of the free radical initiator is not similar to the results which are achieved by the use of catalysts which have been heretofore known in the prior art; for example, chloroplatinic acid, which is known to be useful in the grafting of certain kinds of silanes to rubber has no utility in the present invention.

In carrying out the process of this invention, the backbone polymer is preferably dissolved in an inert aliphatic diluent such as chlorobenzene, isooctane, cyclohexane, benzene, n-heptane, n-hexane, etc.; preferably the concentration of backbone polymer ranges from about 5 to 40 wt. percent, e.g. 10 to 25 wt. percent. The free radical initiator is added to this solution in amounts ranging from 0.01 to 10 moles, preferably 0.1 to 1 mole, per mole of unsaturation in the backbone polymer. In addition, the silane, in amounts ranging from 0.1 to 25 moles, preferably 1 to 6 moles, per mole of unsaturation in the backbone polymer, is added to the reaction mixture as a liquid, diluted with an inert diluent of the type described above, as a gas, or as a gas diluted with an inert carrier gas such as nitrogen, argon, carbon dioxide, etc.

The reaction mixture, preferably flushed with an inert gas to remove any oxygen, is then stirred at 20 to 200° C., preferably 60 to 140° C. and atmospheric to 1000 p.s.i. for 1 to 18, preferably 1.5 to 8 hours. Preferably, the reaction temperature is that which will be just below the decomposition temperature of the free radical catalyst.

The resultant silane-grafted copolymer will contain about 0.03 to about 0.8 mole of silane per mole of unsaturation in the backbone polymer, preferably 0.1 to 0.6 mole of silane per mole of unsaturation in the backbone polymer.

The silane-grafted copolymer of this invention may be cured directly from the cement stage (i.e. in the inert diluent) or converted into a latex prior to curing. Curing is readily accomplished by exposure of the copolymer (at 10 to 100° C., preferably 25 to 70° C.) to atmospheric moisture, for 0.5 to 168 hours or longer; in the alternative, the curing process may be accelerated by exposing the silane-grafted copolymer to steam or actual water immersion for 10 min. to 10 hours, preferably 15 min. to 3 hours. The silane-grafted copolymer prior to curing may conveniently be sprayed over a surface to be coated and then cured to a tough, resilient, waterproof protective layer.

A wide variety of compounding agents may be incorporated with the silane-grafted copolymers prepared by this invention in order to improve or alter their physical properties. Thus, the silane-grafted copolymers may be loaded with up to 500 parts by weight of carbon black, preferably about 50 to 200 parts, in order to increase the stiffness or tensile strength. Preferred carbon blacks are those that contain a low concentration of volatile matter such as graphitized ISAF black. The carbon black may be added to the copolymer before or after it has been reacted with the silane.

Other compounding agents well known in the elastomer art such as calcium carbonate, calcium silicate, silica, clay, talc and titanium dioxide may also be added. Additionally, the graft copolymers may be oil extended with such materials as paraffinic, aromatic and naphthenic oils, or esters such as diisodecylphthalate. Also, it may be desirable in certain instances to blend the backbone polymer with Bright Stock prior to treatment with the silanes. Between about 5 and 300 wt. percent of Bright Stock may be blended with backbone polymer although preferably about 50 to 150 wt. percent can be used. Bright Stock is known in the art to be a high viscosity lubricating oil obtained from residues of petroleum distillation by dewaxing and treatment with fuller's earth, or a similar material.

The invention may be more readily understood by reference to the following examples.

EXAMPLE 1

Piperylene butyl rubber (copolymer of isobutylene and piperylene) having a viscosity average molecular weight of 204,000 and an iodine number of 32.5 (corresponding to 7.3 mole percent unsaturation) was prepared by copolymerizing isobutylene and piperylene in accordance with the process set forth in U.S. Pat. 2,356,128. The crude rubber was dissolved in n-hexane and purified by treatment with silica gel, filtration to remove the silica gel, and isolation by acetone precipitation. One hundred grams of the purified piperylene butyl rubber was dissolved in 1 liter of pure n-heptane in a 2-liter resin flask which was thereafter thoroughly flushed with nitrogen gas to remove any oxygen. After complete flushing, 28 g. (1.5 moles/mole of unsaturation) of trichlorosilane was added to the flask by injection through a rubber septum. The reactants were irradiated for 10 hours using a 2400 curie cobalt-60 source and for 5 hours with a 4800 curie cobalt-60 source; the source was 5 inches from the reaction flask and parallel to its vertical axis. Analysis of the resultant polymer showed that the polymer contained 0.685 wt. percent (0.04 mole/mole of unsaturation) trichlorosilane. After exposure to atmospheric moisture for several hours, the resulting polymer was insoluble in cyclohexane (in contrast to the soluble nature of the starting material) thus demonstrating its room temperature moisture curability.

EXAMPLE 2

Isoprene butyl rubber (isobutylene - isoprene copolymer) having a viscosity average molecular wt. of 40,050 and an iodine No. of 30.3 (corresponding to 4.5 mole percent unsaturation) was dissolved in sufficient cyclohexane to give a 25 wt. percent cement. Example 1 was then repeated with this cement using 23.16 g. of trichlorosilane; the molar ratio of $HSiCl_3$ to polymer unsaturation was greater than 4. The reaction mixture was irradiated for 20 hours with a 1200 curie cobalt-60 source under the conditions set forth in Example 1. Thereafter an additional 26.8 g. $HSiCl_3$ was added and the reaction mixture was irradiated for an additional 20 hours with a 2400 curie cobalt-60 source. Analysis of the resultant polymer showed no silane to be present. After exposure to steam for 5 hours the polymer was still 100% soluble in cyclohexane indicating the total absence of any moisture curability.

EXAMPLE 3

Example 1 was repeated, but in this experiment, 50 ml. of n-heptane containing 5.0 g. of the same piperylene butyl rubber and 1.38 g. (1.6 moles/mole of unsaturation) of trichlorosilane were employed and the free radical source was 0.164 g. of recrystallized benzoyl peroxide added to the solution. After heating, while shaking in an oil bath at 90° C., and thereafter recovering the polymer after 18 hours of heating, a polymer containing 4.59 wt. percent (0.26 mole/mole of unsaturation) trichlorosilane was obtained. Steam curing after 1 hour rendered the resultant polymer insoluble in cyclohexane.

EXAMPLE 4

Example 3 was repeated using 50 ml. of n-heptane containing 4.18 g. of isoprene butyl rubber (visc. avg. mol. wt. 40,050 and iodine no. of 30.3, corresponding to 4.5 mole percent unsaturation), 1.38 g. of trichlorosilane (3.3 moles/mole of unsaturation) and 0.164 g. of recrystallized benzoyl peroxide. After heating at 90° C. for 18 hours, a polymer containing 5.13 wt. percent $HSiCl_3$ (0.5 moles/mole unsaturation) was obtained; however, this polymer was badly degraded. Moreover, the polymer was completely soluble in cyclohexane after steam curing for 5 hours, thus indicating that a moisture-curable rubber had not been obtained.

EXAMPLE 5

A small pressure bottle was charged with 100 ml. of hexane cement containing 20 g. of a piperylene butyl polymer ($M_v$=110,000; Iodine No.=7, corresponding to 1.5 mole percent unsaturation), 0.68 g. of trichlorosilane (1 mole trichlorosilane/mole of polymer unsaturation), and 0.17 g. of benzoyl peroxide (0.14 moles benzoyl peroxide/mole of polymer unsaturation). The bottle was sealed and heated with shaking at 105° C. for 70 minutes. The recovered polymer contained 1.17% (0.3 mole/mole of unsaturation) by weight of incorporated trichlorosilane. After curing for two days at 66° C. and 67% relative humidity, the polymer was 89% insoluble in cyclohexane and showed a weight increase of 856% in cyclohexane (soaking 48 hours at 25° C.).

EXAMPLE 6

A small pressure bottle was charged with 100 ml. of hexane cement containing 10 g. of piperylene butyl polymer ($M_v$=54,000; Iodine No.=15, corresponding to 3.3 mole percent unsaturation), 1.34 g. of trichlorosilane (2 moles/mole of polymer unsaturation), and 0.23 g. of benzoyl peroxide (0.19 mole/mole of polymer unsaturation). The bottle was sealed and heated with shaking at 105° C. for 70 minutes. The recovered polymer contained 3.24% (0.4 moles/mole unsaturation) by weight of incorporated trichlorosilane. After curing for two days at 66° C. and 67% relative humidity, the polymer was 97% insoluble in cyclohexane and showed a weight increase of 862% in cyclohexane (soaking 48 hours at 25° C.).

EXAMPLE 7

A two-liter stainless steel autoclave was charged with 1500 ml. of a hexane cement containing 150 g. of a piperylene butyl polymer ($M_v$=328,000; Iodine No.=12.5, corresponding to 2.8 mole percent unsaturation), 13.4 g. of trichlorosilane, (1.5 moles/mole of polymer unsaturation), and 0.65 g. of benzoyl peroxide (0.04 mole/mole of polymer unsaturation). The reaction mixture was stirred and heated for 60 minutes at 105° C. The recovered polymer contained 0.77% (0.1 mole/mole of unsaturation) by weight of incorporated trichlorosilane. After exposure to room temperature and humidity for seven days, the polymer was 97% insoluble in cyclohexane and showed a weight increase of 882% in cyclohexane (soaking 48 hours/25° C.).

A sample of the polymer compounded with 50 parts of SRF carbon black and 10 parts of oil and cured for four days at room conditions showed a tensile of 380 p.s.i. and an elongation at break of 300%.

EXAMPLE 8

A pressure bottle was charged with 100 ml. of heptane cement containing 10 g. of piperylene butyl ($M_v$= 193,000; Iodine No.—32.5), 0.216 g. of benzoyl peroxide 0.049 g. of azo(bis)isobutyronitrile, and 3.86 g. (2 moles/ mole of unsaturation) of trichlorosilane. The mixture was heated for 72 minutes at 105° C. The recovered polymer contained 2.46% (0.14 mole/mole of unsaturation) by weight of incorporated trichlorosilane and was substantially insoluble in cyclohexane after steam curing for several hours.

EXAMPLE 9

A convenient atmospheric-pressure synthesis made use of a sparging technique, by which a refluxing cement was kept saturated with HSiCl₃, even though the silane was continually boiled away. A 2-liter cylindrical glass reactor heated by circulating hot silicone oil through an external jacket was outfitted with an efficient stirrer, a gas dispersing tube reaching nearly to the stirrer, and an efficient water condenser with subsequent −78° C. traps. Nitrogen (5 p.s.i.) was saturated with HSiCl₃ by bubbling the gas through a trap containing the silane. The polymer cement was brought to temperature and stirred vigorously; the solid initiator was quickly added; and the silane-saturated nitrogen was passsed into the cement. Practical control was achieved by adjusting the reactor jacket temperature, the nitrogen flow rate, the temperature of the silane reservoir, and the speed of agitation.

In this way it was possible to operate successfully with wall temperatures higher than the cement temperature, with reasonable initiator decomposition rates, and at one atmosphere. Not only was the need for pressure equipment obviated, but a minimum amount of excess silane was retained in the cement at the end of the reaction (that boiled off being trapped for re-use). Initiator requirements were somewhat reduced, probably because of the much better mixing and higher concentrations of polymer used in this case. We found it convenient to operate with heptane cements, but doubtless the technique could be adapted for use with hexane cements under a slight partial pressure. This approach was particularly well suited for the preparation of low molecular weight moisture-curable materials, since quite high cement concentrations (up to 40/wt./vol.) could be used. Table I shows the results of this experiment.

This invention has been described in connection with certain specific embodiments thereof; however, it should be understood that these are by way of example rather than by way of limitation, and it is not intended that the invention be restricted thereby.

What is claimed is:

1. A moisture-curable polymer comprising a silane grafted onto an unsaturated copolymer,
   (a) said silane being present in an amount of about 0.01 to about 0.8 mole per mole of unsaturation in the copolymer, and said silane having the formula:

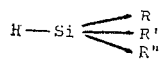

wherein R and R' are the same or different substituents selected from the group consisting of hydrogen, $C_1$ to $C_{12}$ hydrocarbyl radicals, halogens, $C_1$ to $C_4$ alkoxy radicals and $C_2$ and $C_7$ acyloxy radicals and R'' is selected from the group consisting of halogens, $C_1$ to $C_4$ alkoxy radicals and $C_2$ to $C_7$ acyloxy radicals; and
   (b) said unsaturated copolymer:
      (1) being mastic or elastomeric in nature and having a viscosity average molecular weight of about 3,000 to about 1,500,000,
      (2) being formed from 60–99.5 wt. percent of a $C_4$–$C_7$ isoolefin and 40–0.5 wt. percent of a conjugated diolefin having the formula:

$$R_1-CH=CH-CH=CH-R_2$$

wherein $R_1$ and $R_2$ are the same or different substituents selected from the group consisting of hydrogen, $C_1$ to $C_8$ alkyl radicals, phenyl radicals, $C_7$ to $C_{12}$ alkyl-substituted phenyl radicals and $C_5$ to $C_8$ alicyclic or alkyl-substituted alicylic radicals,
      (3) containing at least 70 mole percent of the conjugated diolefin units copolymerized with the isoolefin units in a 1:4 fashion, and
      (4) containing about 0.5 to about 12 mole percent unsaturation.

2. The polymer of claim 1 in which the isoolefin is isobutylene and the diolefin is piperylene.

3. The polymer of claim 1 in which the silane is trichlorosilane.

TABLE I

| [Sparging reactions between HSiCl₃ and piperylene butyl rubber a] | | | | | | |
|---|---|---|---|---|---|---|
| Run | A | B | C | D | E | F |
| Polymer | b 150 | b 150 | c 450 | c e 333 | f 540 | c 450 |
| Grams benzoyl peroxide | 2.0 | 1.7 | 7.7 | 5.6 | 9.4 | 9.0 |
| Moles benzoyl peroxide per mole unsaturation | 0.14 | 0.12 | 0.12 | 0.12 | 0.12 | 0.14 |
| Weight percent HSiCl₃ in product cement | 2.69 | 2.97 | 3.40 | 2.71 | 2.73 | 3.74 |
| Weight percent HSiCl₃ incorporated in polymer | 1.89 | 2.15 | 2.61 | 2.63 | | 3.46 |
| Cured properties (66° C. and 67% rel. hum.) wt. percent insolubles/wt. percent gain: | | | | | | |
| 1 day | 97.2/465 | d 95.8/627 | 86.9/540 | | 47.1/1305 | |
| >7 days | 97.2/427 | | 94.8/437 | 86.2/526 | 93.7/418 | 89.4/189 | a 1,500 ml. heptane cement; heated jacket temp. 100° C.; cement temp. 84–94° C.; 200 g. HSiCl³ sparged in at 2 ml./min. by nitrogen; total heating time: 18 hr.
b 10% wt./vol., visc. mol. wt. 266,000; mole percent unsat. 2.3 (60 mmoles unsat./150 g.).
c 30% wt./vol., visc. mol. wt. 39,888; mole percent unsat. 3.3 (265 mmoles unsat./450 g.).
d Brookfield viscosity of product cement: 0.1 that of starting cement.
e 1,100 ml.
f 36% wt./vol.; same polymer as (c).

References Cited

UNITED STATES PATENTS

| 2,952,576 | 9/1960 | Wheelock et al. | 154—46 |
| 3,075,948 | 1/1963 | Santelli | 260—45.5 |
| 3,366,612 | 1/1968 | Baldwin et al. | 260—85.3 |
| 3,432,577 | 3/1969 | Serniuk | 260—879 |
| 3,503,943 | 3/1970 | Kresge et al. | 260—80.78 |

JOSEPH L. SCHOFER, Primary Examiner

R. A. GAITHER, Assistant Examiner

U.S. Cl. X.R.

260—46.5, 94.7, 824